Jan. 13, 1959

A. J. CELENTANO 2,868,880

REMOTE CONTROL OF TELEPHONE ANSWERING AND MESSAGE RECORDING FACILITIES IN A TELEPHONE STATION

Filed Feb. 7, 1957

4 Sheets-Sheet 1

INVENTOR
A. J. CELENTANO
BY V. P. Biolo
ATTORNEY

Jan. 13, 1959 A. J. CELENTANO 2,868,880

REMOTE CONTROL OF TELEPHONE ANSWERING AND MESSAGE RECORDING FACILITIES IN A TELEPHONE STATION

Filed Feb. 7, 1957 4 Sheets-Sheet 2

INVENTOR
A. J. CELENTANO
BY V. P. Priolo
ATTORNEY

INVENTOR
A. J. CELENTANO
BY V. P. Triolo
ATTORNEY

Jan. 13, 1959 A. J. CELENTANO 2,868,880

REMOTE CONTROL OF TELEPHONE ANSWERING AND MESSAGE RECORDING FACILITIES IN A TELEPHONE STATION

Filed Feb. 7, 1957 4 Sheets-Sheet 4

INVENTOR
A. J. CELENTANO
BY V. P. Triolo
ATTORNEY

United States Patent Office 2,868,880

Patented Jan. 13, 1959

2,868,880

REMOTE CONTROL OF TELEPHONE ANSWERING AND MESSAGE RECORDING FACILITIES IN A TELEPHONE STATION

Arnold J. Celentano, Bronx, N. Y., assignor to Bell Telephone Laboratories, Incorporated, New York, N. Y., a corporation of New York Application February 7, 1957, Serial No. 638,843

11 Claims. (Cl. 179—6)

Figures 1, 5:
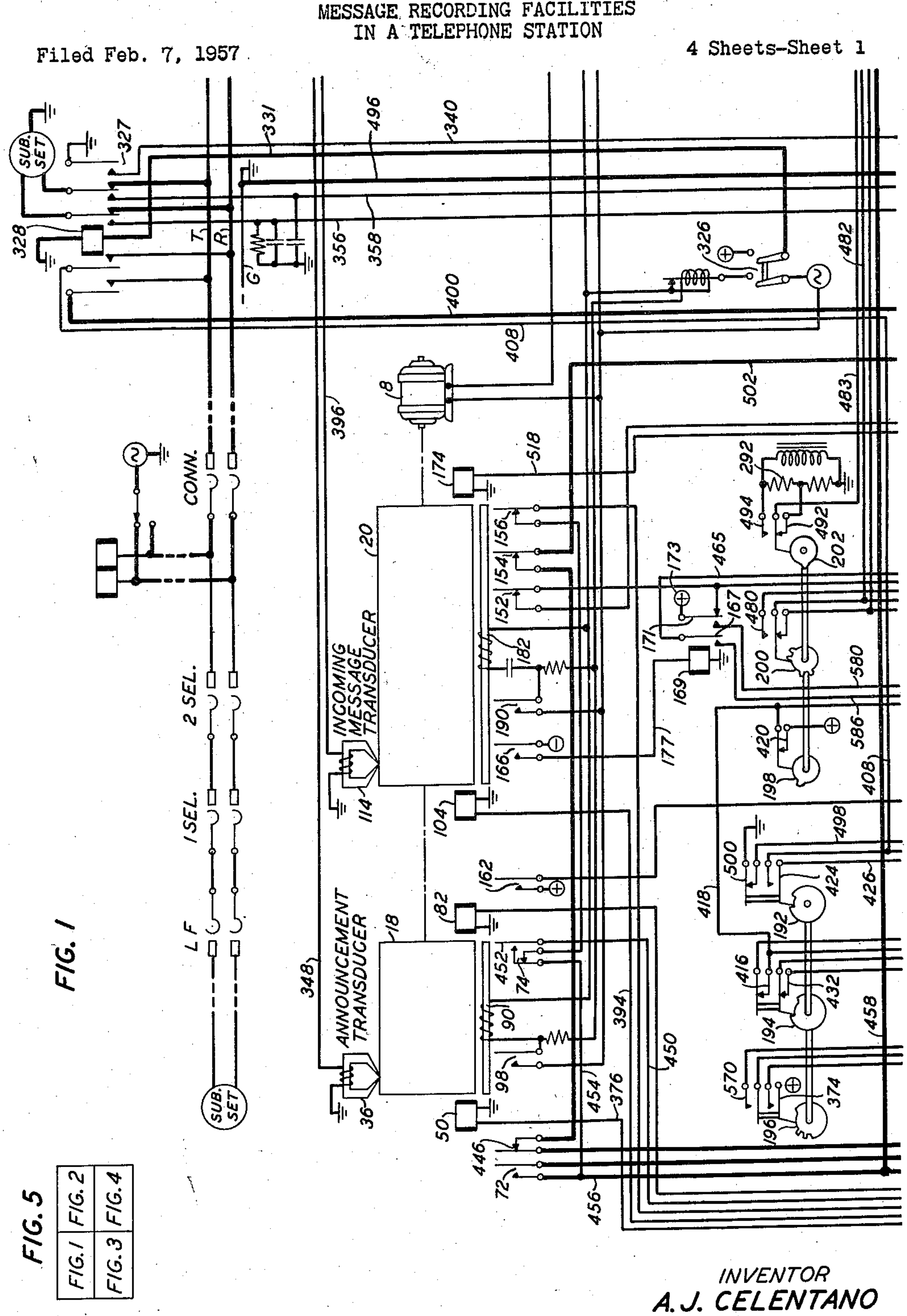
Figure 2:
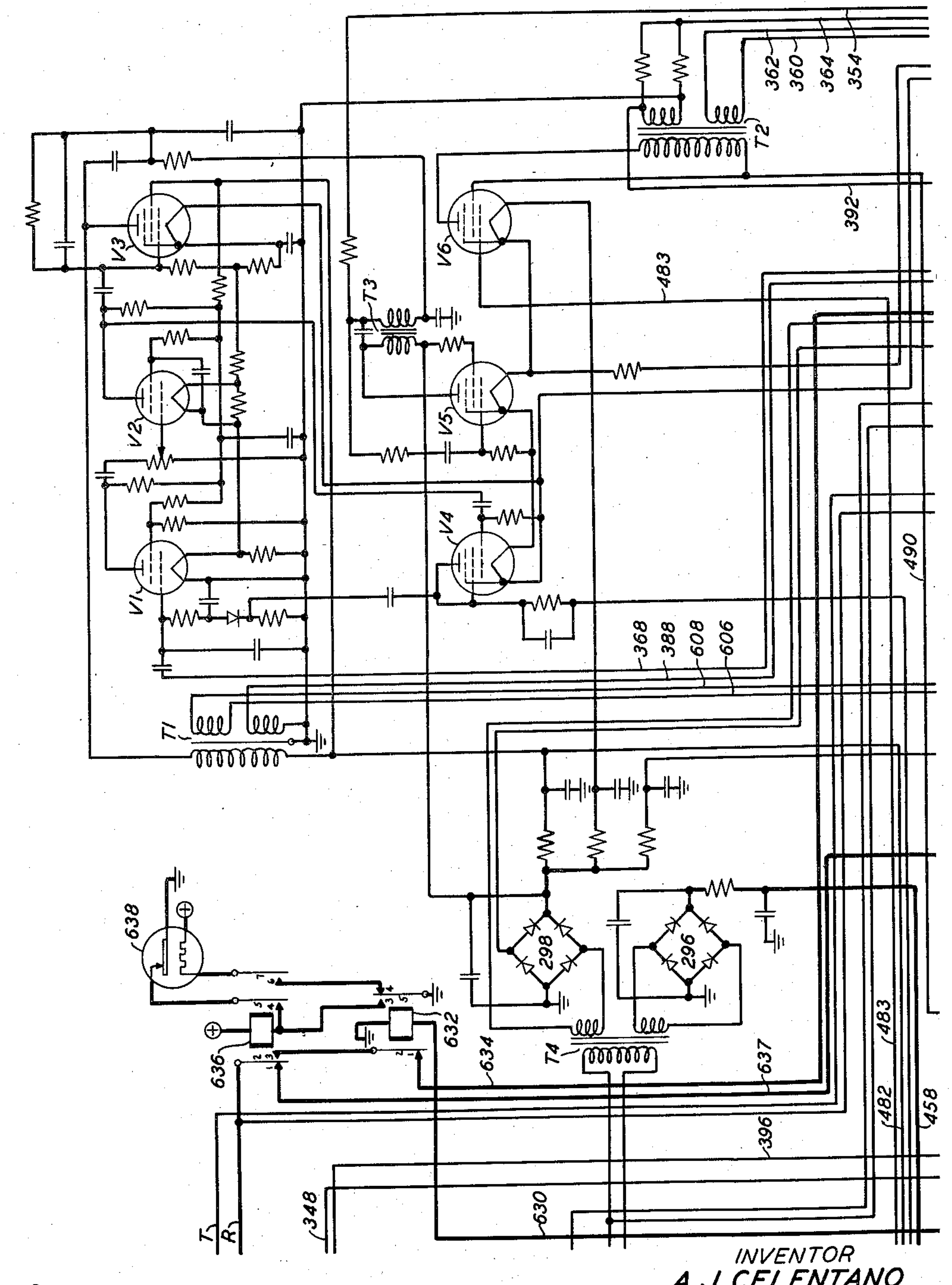
Figure 3:
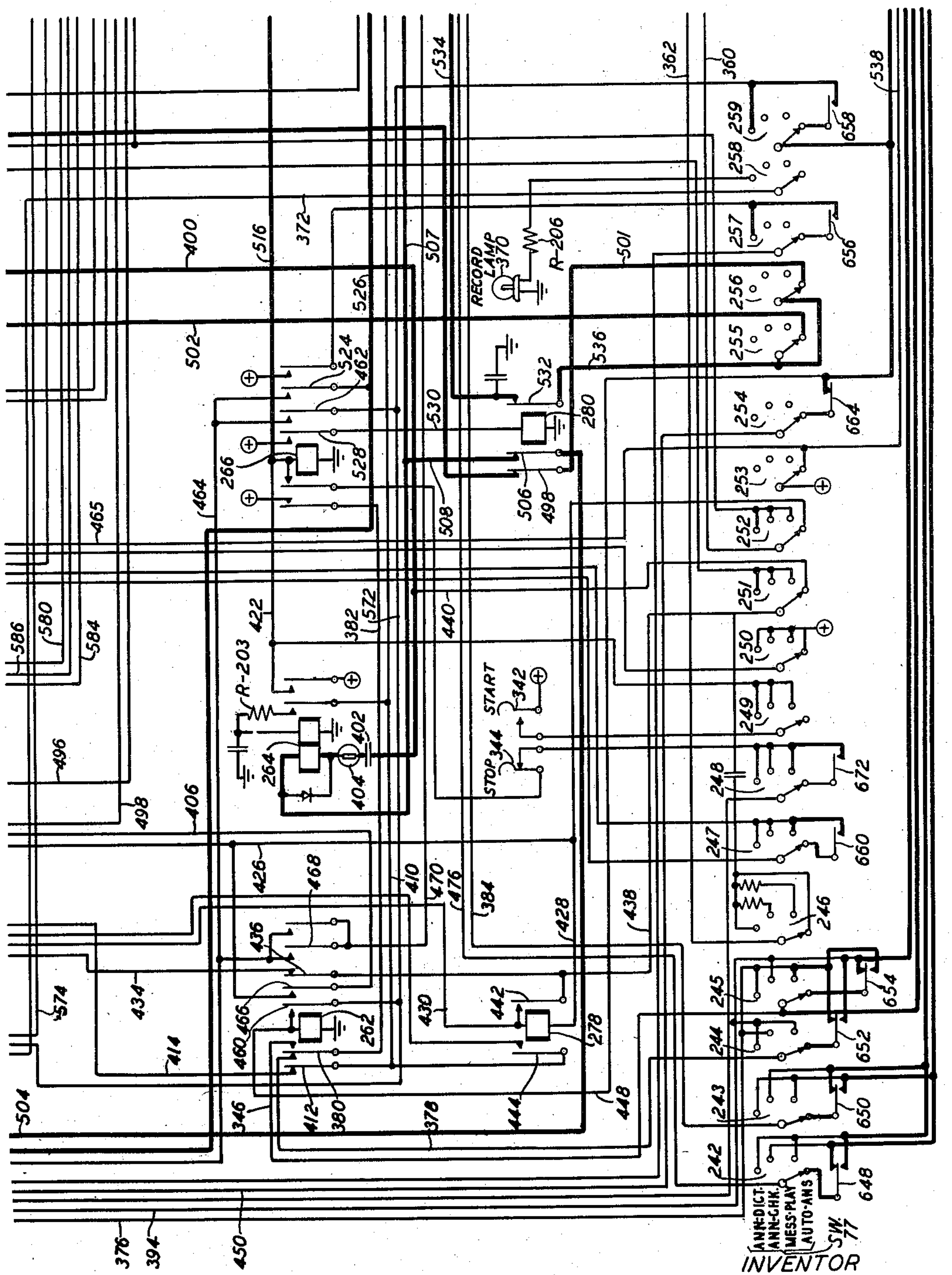
Figure 4:
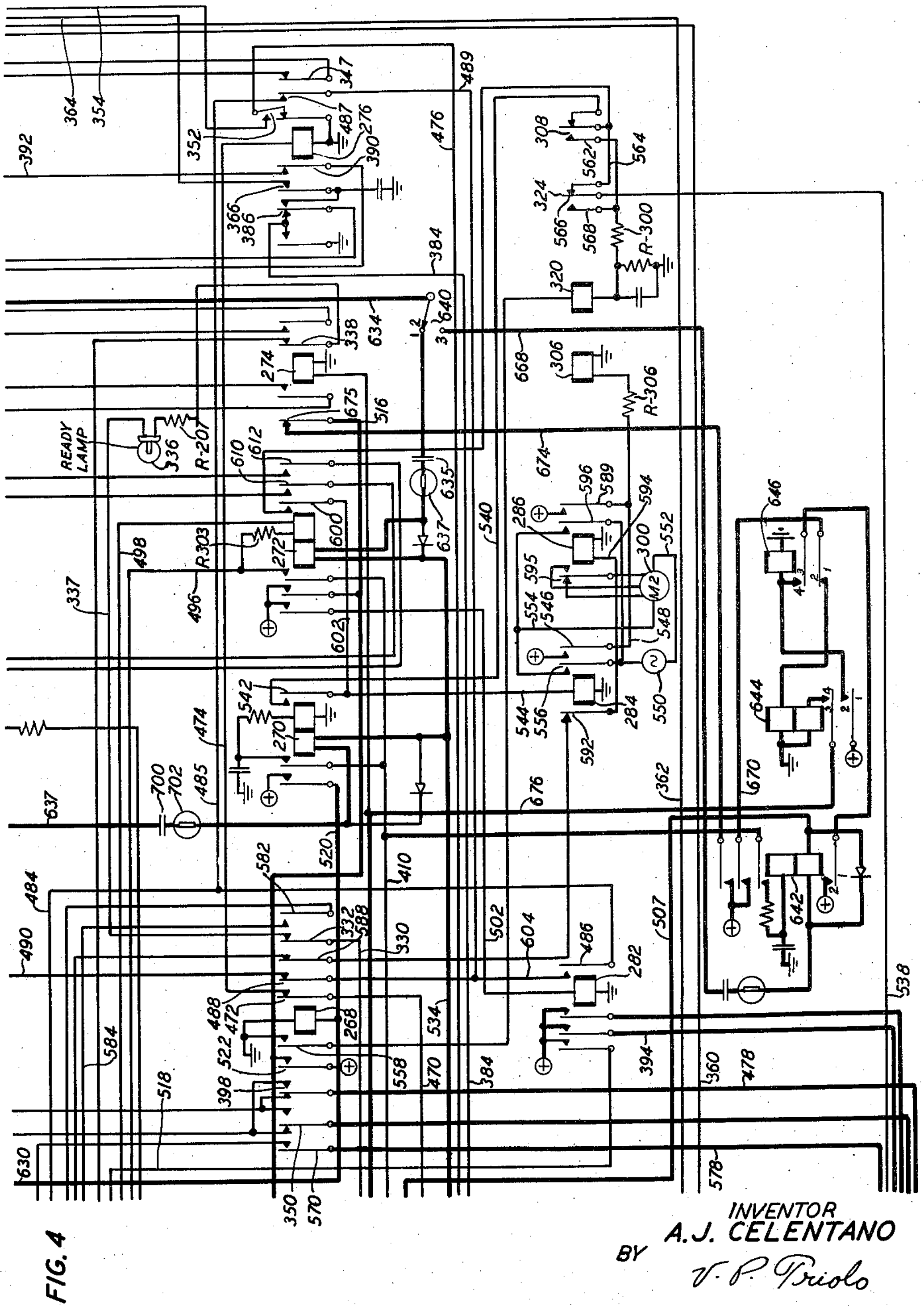

This invention relates to telephone systems which include stations provided with answering and message recording facilities, and particularly to telephone systems wherein said facilities are arranged for remote control of message recording, playback and erasure.

Broadly considered, the object of the invention is to increase the efficiency and field of usefulness of automatic telephone answering and message recording systems.

More particularly, the present invention comprises certain novel features and improvements which may be applied to the system disclosed in the patent application of R. A. Miller et al., Serial No. 588,010, filed May 29, 1956.

By the means provided in the present invention a single telephone line is so arranged that by calling one of two distinct numbers ringing current may be sent over one conductor of the line to condition a subscriber's automatic telephone answering and message recording facility or set for transmitting a prerecorded announcement to a calling party and recording a message from said calling party; and by calling the other of said numbers from a remote location ringing current may be sent over the other conductor of the line to condition the set for playing back said recorded message to said remote location and either erasing said recorded message or erasing said announcement and recording a new announcement from said remote location.

A particular feature of the invention resides in the arrangement for individually conditioning the means for playing back the recorded message, the means for erasing said recorded message, and the means for erasing the announcement and recording a new announcement, each of said means being responsive to the ringing signal transmitted over one of the conductors of the line.

This arrangement comprises a first switch means which initially connects the playback means to the conductor over which the signal is to be transmitted and breaks this connection after the playback means responds to said signal, and a second switch means which may be preset by the subscriber to provide either erasure of the recorded message or erasure of the announcement and recording of a new announcement. After playback of the recorded message has been terminated the first switch means operates to connect, through said second switch means, either the record erase means or the announcement erase and recording means to the conductor for a predetermined time interval. During this time interval the signal must again be transmitted over the conductor if either of said erase means is to be energized. If the signal is transmitted within said time interval, one of said erase means, preselected by said second switch means, will respond to said signal and complete its cycle of operation. Whether or not said signal is again transmitted over the conductor, the first switch means will, after said time interval, restore the initial connection between the conductor and the playback means.

The invention may be used most effectively if only one of the numbers is published in the telephone directory for the use of all parties desiring to communicate with the subscriber, and the other number is used by the subscriber to control his answering and recording facility from a remote location.

The nature of the invention and its distinguishing features and advantages will be more clearly understood from the following detailed description and the accompanying drawings in which:

Figs. 1, 2, 3 and 4 when assembled as indicated in Fig. 5 constitute a disclosure of one embodiment of the present invention, as outlined in heavy lines, and a disclosure of how said embodiment may be applied to the system disclosed in the above-identified patent application of R. A. Miller et al.

Except for the modifications and structure relating to the present invention the structure shown in Fig. 5 is the same as that shown in Fig. 33 of the above-identified patent application of R. A. Miller et al. and described therein. The following detailed description will therefore be limited to that portion of the disclosure shown in Fig. 5 which is pertinent to the present invention.

Referring now to Fig. 5 the single telephone line connected to an automatic telephone answering and recording device of the type shown and described in detail in the above-identified patent application of R. A. Miller et al. comprises conductors T and R.

*Automatic answer—ringing current transmitted over conductor T*

With the on-off switch 326 in the on position power is applied to relay 328 over conductor 331. With function switch 77 at automatic answer, and the talk-in or incoming message transducer 114 in position to receive a message, switches 152, 154, 156 are closed and switch 166 is open. Ready lamp 336 is lighted when power is supplied through normal contact 171 of relay 169, switch 152, contact 338 of relay 274, over conductor 337, through contact 332 of relay 268 over conductors 330 and 340, and through operated contact 327 of relay 328 to ground.

Ringing current operates relay 264 over a path including conductor T, relay 328, conductor 400, capacitor 402, thermistor 404, relay 264 winding, normal contact 506 of relay 280, conductor 504, switches 446, 154, 255 and 256, conductor 501, normal contact 498 of relay 280, and conductor 496 to the terminal strip ground. Relay 264 locks up through resistor R–203, conductor 410, contact 412 of relay 262, conductor 414, switch 416 of cam 194, conductor 418 and switch 420 of cam 198.

Relay 264 operates relay 266 through conductor 422. Relay 266 operates relay 274 through conductor 526, contact 524 of relay 266, conductors 464 and 458 and power source 296, starting motor 8, energizing the amplifier and extinguishing the ready lamp 336.

Relay 266 operates solenoid 50 over a path which includes conductor 376, switch 652, switch 244, conductor 378, contact 380 of relay 262 and conductor 382. The talk-out or announcement drum 18 and cams 192, 194 and 196 rotate.

Approximately 3½ seconds after the first ring, switch 424 of cam 192 completes termination of the telephone line over a path which includes conductors 408 and 406, switch 424 of cam 192, conductors 426 and 428, the winding of relay 278, conductor 430, switch 432 of cam 194, conductor 434, contact 436 of relay 262, conductor 438, switch 251, conductors 440 and 400 and contacts of relay 328.

Relay 278, the "calling party disconnect" relay, operates and holds independent of switch 432 and relay 262 by closing its contact 442.

The talk-out or announcement transducer 36 is connected to the amplifier input over a path which includes conductor 348, contact 350 of relay 268, switch 650, switch 243, conductor 384, contact 386 of relay 276 and conductor 368. The amplifier output is connected to the line through transformer T1, conductor 388, contact 390 of relay 276, conductor 392, transformer T2, conductors 360 and 362, switches 246, 251 and 252, conductors 440 and 400, conductors 428 and 426, switch 424 of cam 192, conductor 408, and relay 328. About one second after the telephone line is terminated cam 194 opens switches 432 and 416 making line termination dependent on the holding of relay 278 through its contact 442 and switches 424 and 251, and the lockup of relay 264 dependent on contact 444 of relay 278. Any interruption of central office power will cause relay 278 to release which would open its contact 444 and cause the telephone answering device to return to standby condition by the release of relay 264 which also releases relays 266 and 274.

If a calling party disconnects during the talk-out message, the open contacts of switch 446 (opened by the operation of solenoid 50) will break the telephone ground circuit (conductor 496, contact 498 of relay 280, conductor 501, switches 256 and 255, conductor 502, switch 154, switch 446, conductor 504, contact 506 of relay 280, conductor 508, winding of relay 264, thermistor 404, condenser 402, conductor 400 and relay 328) and prevent a new call being received until the talk-out drum is indexed.

At the end of the talk-out message adjustable limit switch 74 operates relay 262 over a path which includes conductor 448, switch 664, switch 254, conductor 450, closed contact 452 of switch 74, conductors 454, 456 and 458 and rectifier 296. Relay 262 closes contact 460 and locks up through contact 462 of relay 266 and conductors 464 and 458, and contact 466 of operated relay 262 takes over the job of holding the telephone line from switch 424 of cam 192. The solenoid 50 is released by the opening of contact 380 of relay 262 due to the operation of relay 262 and the talk-out drum and cams 192, 194 and 196 return to standby or normal positions.

Relay 278 remains under the control of central office power.

Solenoid 104 is operated through contact 346 closed by the operation of relay 262, switch 654, switch 245, and conductor 394. The pawl 106 is disengaged from the slot 108 in talk-in drum 20 (as shown and described in the above-identified application of R. A. Miller et al.) and the talk-in drum and cams 198, 200 and 202 start rotating. Relay 276 is operated over a path which includes conductors 458 and 456, contact 468 of relay 262, conductor 470, contact 472 of relay 268 and conductor 474.

The telephone line is connected to the input of the amplifier via relay 328 over conductors 408 and 400, 426 and 440, operated contact 466 of relay 262, conductor 428, switches 252, 251 and 246, conductors 360 and 362, transformer T2, conductor 364, contact 366 of relay 276 and conductor 368. The amplifier output is connected to the talk-in transducer 114 through transformer T3, conductor 354, contact 352 of relay 276, conductor 476, switch 242, switch 648, conductor 478, contact 398 of relay 268 and conductor 396.

Cam 200 operates switch 480 about one-half second after limit switch 74 operates, thereby connecting the output of power rectifier 298 to the anode of the beep tone amplifier V6 through conductor 482, switch 480, conductors 484 and 485, contact 487 of relay 276, conductor 489, contact 488 of relay 268 and conductor 490. The input to the beep tone amplifier V6 is obtained from the beep tone generator 292 through switch 492 of cam 202 and conductor 483. The beep tone level is controlled by the voltage dividers R–205 and R–204, the level of the first three beeps (the first two, one second apart, to indicate that the incoming message may be recorded and the third, 25 seconds after the second, to indicate the approach of the end of the maximum recording time) is set to give a level of about minus 10 decibels (as referred to one milliwatt) on the line. Cam 202 closes switch 494 at the same time as the last of four lobes on cam 200 closes switch 480 to increase the level of the last or fourth warning beep to about minus 5 decibels (as referred to one milliwatt). The fourth beep follows the third beep by about one second.

The talk-in message is recorded on talk-in drum 20. Cam 200 operates switch 480 again about 25 seconds after recording starts, sending the third and fourth beeps out on the line in the same manner as the first and second beeps.

As described above, cam 202 operates switch 494 and overlaps the fourth operation of switch 480 by cam 200 so that the fourth and last beep is 5 decibels higher in level than the others and follows the third after a one-second interval.

Switch 420 of cam 198 releases relay 264 about 2½ seconds after the last beep tone is transmitted, allowing a total of 30 seconds' recording time including transmission of beep tones.

All relays release, the motor 8 stops, the talk-in drum 20 stops and the cams 198, 200 and 202 return to standby or zero position.

The telephone line is released and the device is ready to answer another call.

If the telephone line current is interrupted for a short time, as by calling party disconnect, before the 30-second incoming message recording time has elapsed, relay 278 releases as described heretofore, stopping all motion and restoring the device to standby. Ringing current will be necessary to set the device in motion again.

When the talk-in transducer 114 reaches the point on drum 20 where enough record medium remains for only 35 seconds of message recording, switch 152 is opened and the ready lamp will not light. A short distance further on the talk-in drum, equivalent to 5 seconds of message recording, switch 154 breaks the telephone ground circuit (referred to above) and a "don't answer" condition is presented to subsequent calls. After the transducer 114 traverses an additional distance, equivalent to 30 seconds of message recording, switch 156 opens. Switch 156 opens the lock-up circuit of relay 266 which does not allow solenoid 104 to become energized so that the transducer 114 cannot run off the end of the drum 20 if the subscriber starts to play back without turning the scanning knob toward zero.

As already indicated, the present invention is designed to function with "calling party disconnect" facilities. At locations where this facility is not available, the machine will operate normally, without internal modifications, but on a fixed time talk-in message basis, i. e., the talk-in message drum will run its full cycle, 30 seconds, whether or not the calling party completes his message and disconnects in less than the allotted time.

*Message playback under control from a remote station—ringing current transmitted over conductor R*

The function switch 77 is turned to automatic answer. With the on-off switch 326 turned on alternating-current power is applied to the unit and relay 328 is energized by power applied over conductor 331.

The ready lamp 336 is energized in the manner previously described and the answering device is in stand-by condition.

Ringing current operates relay 270 over a path including conductor R, closed contacts 1 and 2 of relay 636, conductor 637, capacitor 700, thermistor 702, relay 270 winding, conductor 534, contact 532 of relay 280, conductor 536, switch 256, conductor 501, contact 498 and conductor 496 to ground. Relay 270 locks up through conductor 410, contact 412 of relay 262, conductor 414, switch 416 of cam 194, conductor 418 and switch 420 of cam 198.

Relay 268 is energized by power provided over conductor 520.

Relay 266 is energized by power provided through contact 522 of relay 268 and over conductor 516. Relay 274 is energized by power provided over conductors 458, 456 and 464, through contact 524 of relay 266 and over conductor 526.

In the manner previously described, the operation of relays 266 and 274 energizes solenoid 50 and motor 8. Announcement drum 18 and cams 192, 194 and 196 rotate.

Relay 280 is energized by power provided through contact 528 of relay 266 and over conductor 530. Operation of relay 280 opens contacts 498 and 532 thereby breaking the telephone ground continuity held through conductor 534, contact 532, conductor 536, switch 256, conductor 501, contact 498 and conductor 496.

Relay 278, the calling party disconnect responsive relay, then seizes the telephone line by means of the path which includes conductor 400, conductor 440, switch 251, conductor 438, contact 436 of relay 262, conductor 434, switch 432 of cam 194, conductors 430, 428 and 426, switch 424 of cam 192 and conductor 408 and relay 328.

Relay 284 is energized by power provided over switch 253, conductor 538, switch 324, switch 308, conductor 540, contact 542 of relay 270 and conductor 544.

As described in the above-identified patent application of R. A. Miller et al., solenoid 306 is energized by power provided through contact 546 of relay 284 and over conductor 548 and resistor R–306. Solenoid 306 operates to rotate bail 134 and disengage half-nut 122 from lead screw 124.

Scan motor 300 is energized by power from source 550 provided over conductors 552 and 554, and through contact 556 of relay 284. Motor 300 drives carriage 116 back to its initial position. As this point is reached, microswitch 308 on the "playback index" carriage 310 is operated (contact 562 is closed) by the motion of carriage 116 to deenergize relay 284, motor 300 and solenoid 306 and allow half-nut 122 to reengage lead screw 124.

Operation of microswitch 308 also energizes solenoid 320 by providing power over the path which includes operated contact 558 of relay 268, conductor 560, resistor R–300, operated contact 562 of switch 308, conductor 564, contact 566 of switch 324, conductor 538 and switch 253. Solenoid 320 operates and actuates latch 322 which, in turn operates switch 324 to lock up solenoid 320 through contact 568 of switch 324 and conductor 538, and holds relay 284 deenergized.

About 3.5 seconds after the start of the first telephone ring switch 570 of cam 196 closes. Relay 262 is then energized by power provided from rectifier 296 through contact 462 of relay 266 and over conductors 572 and 574, contact 576 of relay 268, conductor 578 and conductor 448. Drum 18 indexes when contact 380 of relay 262 opens. In the manner previously described relay 276 operates, solenoid 104 is energized and drum 20 and cams 198, 200 and 202 rotate.

Playback commences and "playback index" carriage 310 is carried forward by carriage 116 which engages latch 322. The messages on the incoming message drum 20 are reproduced and transmitted to the telephone line from amplifier output transformer T2, over conductors 360 and 362, switches 246, 251 and 252, conductors 426 and 440, switch 424 and conductors 408 and 400 and relay 328.

Relay 268 also takes the telephone line release control away from switch 420 of cam 198 by completing the path to conductor 418 from power source 173 through contact 171 of operated relay 169, conductor 580, contact 582 of relay 268 and conductor 584. Relay 169 operates as soon as motor 300 starts to drive carriage 116 toward start of record. Relay 169 operates through switch 166 and conductor 177. If the subscriber calling from a remote station hangs up before the last message recorded on the incoming message drum is played back to him, calling party disconnect responsive relay 278 is deenergized and drops out.

Contact 444 of relay 278 opens and the holding circuit for relay 270 is broken. Relay 270 is deenergized and as a result, relay 268 is also deenergized.

The release of relay 268 opens the locking circuits for relays 262 and 266. Relays 262 and 266 also drop out. Solenoid 104 is deenergized and drum 20 and cams 198, 200 and 202 stop rotating. Release of relay 266 drops out relay 280.

The release of relay 268 and opening of contact 558 causes solenoid 320 to become deenergized. As a result, latch 322 is released. Release of latch 322 allows "playback index" carriage 310 to remain in this position while message transducer carriage 116 is driven forward to the last recorded message position.

Relay 286 is energized, as solenoid 320 becomes deenergized, by power connected through switch 253, conductor 465, contact 167 of relay 169, conductor 586, contact 588 of relay 268, conductor 590, contact 592 of relay 284 and conductor 594. Contacts 596 and 598 of relay 286 are closed to start motor 300 and energize solenoid 306. Solenoid 306 rotates bail 134 to disengage half-nut 122 from lead screw 124. Scan motor 300 reverses by the closing of contact 595 of relay 286 and drives carriage 116 toward pilot carriage 170, carriage 170 being located at the position which corresponds to the end of the last message recorded on drum 20. When switch 166, which is mounted on carriage 116, comes in contact with member 168 mounted on carriage 170 it opens. On opening, switch 166 causes relay 169 to become deenergized. This causes contact 167 to open which results in the release of relay 286. Scan motor 300 and solenoid 306 are deenergized.

All motion ceases, the ready lamp lights and the device is ready to accept another incoming message or another call from the subscriber at the remote station.

If the subscriber calling from a remote station stays on the line until the last recorded message is played back to him, switch 166 will open on contacting member 168 on carriage 170. On opening, switch 166 will cause relay 169 to become deenergized. As a result, contacts 167 and 171 will open. The opening of contact 171 will open the holding circuit for relay 270. Relay 270 will drop out and the release sequence already described will be followed. Relay 286 will not be energized since carriage 116 is already resting in the proper position to accept new incoming messages (it has contacted carriage 170 and switch 166 and contact 167 are open).

*No calling party disconnect facility*

If this facility were not provided, the operational sequences described hereinbefore would be valid with the exceptions that relay 278 would not control the release of relay 270 and the playback index feature would not be made available. Every remote message playback would start with the first message recorded on the incoming message drum 20 and would continue to the end of the last recording message.

Whether or not calling party disconnect facilitates are available switches 152 and 154 will partially disable the device when the incoming message drum has been fully recorded. Further calls from the incoming message telephone line will not be accepted. However, the subscriber calling from a remote station will be able to call in for playback of the messages from a completely filled drum. Also, as will be described hereinafter, he will be able to erase the incoming message drum and thereby prepare it to accept further incoming messages.

*Erasure of recording messages under control from a remote station—ringing current transmitted over conductor R*

When relay 270 responds to ringing current over conductor R, as described above, to condition the telephone answering set for playback of the recorded incoming messages, battery is applied over conductors 520 and 630 to operate relay 632. Relay 632, on operating, closes contacts 3, 4 thereby applying ground to and energizing relay 636. Relay 636 closes contacts 4, 5 and locks up under control of a time delay device, such as thermal relay 638, opens contacts 1, 2 and closes contacts 2, 3 in the operate path for relay 272. This operating path is broken at contacts 1, 2 of relay 632 which remains energized as long as the playback control relay 270 remains in the operate condition.

When playback of the recorded messages is terminated, relay 270 releases thereby releasing relay 632 and closing contacts 1, 2 in the operate path for relay 272. Relay 632, when released also applies ground to and energizes thermal relay 638 through its contacts 4, 5 and contacts 6, 7 of relay 636.

Relay 638 may be set to operate after a predetermined time interval. With switch 640 operated to close contacts 1, 2, ringing current applied to conductor R within the predetermined time interval and prior to the operation of relay 638 will energize relay 272 to condition the set for erasure of the recorded messages. Ringing current will be provided over the path including conductor R, closed contacts 2, 3 of relay 636 and 1, 2 of relay 632, conductor 634, closed contacts 1, 2 of switch 640, capacitor 635, thermistor 637, winding of relay 272, conductor 534, contact 532, conductor 536, switch 256, conductor 501, contact 498 and conductor 496 to ground.

As described in the above-identified patent application of R. A. Miller et al., relay 272, on responding to ringing current, locks up through the holding circuit comprising conductor 410, contact 412 of relay 262, conductor 414, switch 416 (cam 194), conductor 418 and switch 420 (cam 198), and conductor 498 and switch 500 (cam 192).

Relay 272 operates and energizes relay 282 by providing power over conductor 502, and relay 266 by providing power over conductor 516.

On operating, relay 282 energizes solenoid 104 by providing power over conductor 394 and solenoid 174 by providing power over conductor 518.

On operating, relay 266 energizes solenoid 50 by providing power over the path which includes conductor 382, contact 380 of relay 262, conductor 378, switch 244, switch 652 and conductor 376, and energizes relay 274 by providing power from rectifier 296 over conductors 458, 464 and 526.

With solenoids 50 and 104 operated and relay 274 energized, motor 8 rotates all cams and both drums.

Solenoid 174, on operating, actuates arm 184 which moves erase coil 182 close to the record medium on drum 20. The erase current is turned on by switch 190 which closes as arm 184 is actuated. Carriages 170 and 310 are released and returned to the zero position by spring 318.

Relay 284 is energized by power provided over switch 253, conductor 538, switch 324, conductor 564, contact 600 of relay 272, conductor 602 and conductor 544.

Solenoid 306 and motor 300 are energized through contacts 546 and 556 of relay 284. Motor 300 drives the carriage 116 back to its start position on drum 20.

As soon as relay 282 operates, two signal tones are transmitted to the telephone line. These signal tones advise the calling subscriber that he has reached the correct number and that the erase cycle has started. The operation of relay 282 closes contact 486 and, on the closing of switch 480 by cam 200, voltage is supplied to the anode of the signal tone amplifier V6 over the path which includes rectifier 298, conductor 482, switch

480, conductor 484, contact 486 of relay 282, conductor 604, contact 488 of relay 268, conductor 490, and the winding of transformer T2. The output of amplifier V6 is transmitted to the calling subscriber over the path which includes a secondary winding of transformer T2, conductor 392, contact 390 of relay 276, conductor 388, the winding of transformer T1, conductors 606 and 608, contacts 610 and 612 of relay 272 and conductors T and R. Once the erase cycle is started nothing can be done from a remote location to stop it.

The erase cycle is timed by cam 194 through switch 416. About 3½ seconds after the start of the first telephone ring, switch 416 opens and breaks the holding circuit for relay 272.

Relay 272, on being deenergized, drops the telephone line and relays 266 and 282. All motion ceases.

Relay 638 controls the time interval during which the erase function must be initiated. After relay 638 operates the initial connections will be reestablished and ringing current applied to conductor R will operate relay 270.

*Erasure of announcement and recording of a new announcement under control from a remote station—ringing current transmitted overconductor R*

After remote playback of the recorded incoming messages has terminated, thermal relay 638 starts to time, as described above. When the subscriber calls his unlisted number within the time period set by relay 638, he has the option of either erasing the recorded messages, as described above, or erasing the announcement and recording a new announcement.

The option is determined by the position of switch 640. In the embodiment shown in Fig. 5 switch 640 is shown as a manually operated switch.

With switch 640 operated to open contacts 1,2 and close contacts 2, 3, ringing current applied to conductor R after termination of playback of the recorded messages and within the time interval set by relay 638 will follow the path including closed contacts 2, 3 of relay 636, closed contacts 1, 2 of relay 632, conductor 634, closed contacts 2, 3 of switch 640, conductor 668, winding of relay 642, conductors 507 and 508, contact 506 of relay 280, conductor 504, switch 446, switch 154, conductor 502, switches 255 and 256, conductor 501, contact 498 of relay 280 and conductor 496 to ground. Relay 642, operated, locks up over the path including conductor 410, contact 444 of calling party disconnect relay 278, conductor 418 and switch 420 of cam 198. Relay 642, operated, applies battery to lead 670 to operate relay 644 through contacts 1, 2 of relay 646. Relay 624, operated, also applies battery over conductor 674, closed contact 675 of relay 274 and conductor 516 to operate relay 266. Relay 644, operated, closes contacts 1, 2 to operate relay 646. Relay 646 locks up through its contacts 3, 4 and contacts 1, 2 of relay 642. Relay 644 locks up through its contacts 3, 4, conductors 676 and 526, switch 72, conductors 456 and 458 to power source 296.

Relay 642 controls switches 660, 664 and 672.

Relay 644 controls switches 648, 650, 652, 654, 656 and 658.

These switches are shown in Fig. 5 in the position held when relays 642 and 644 are deenergized. When relays 642 and 644 are operated the switches are actuated to prepare the machine for the recording of an announcement.

Relay 266, operated locks through the stop switch 344, switch 248, switch 672, switch 156, switch 74, and conductors 456 and 458. Relay 266 operates relay 274, starting the motor 8, applying amplifier power and extinguishing ready lamp 336. As described in the above identified patent application of R. A. Miller et al., relay 226 operates solenoid 82, the announcement erase solenoid, by supplying power through switch 257, and solenoid 82 moves the erase coil 90 close to the talk-out drum 18 and releases the adjustable limit switch holding mechanism 80 which allows switch 74 to drop back to the minimum announcement position. Erase current is supplied through switch 98. Relay 266 operates relay 262 by supplying power through switch 259, switch 658, and operated contact 462 of relay 266. Relay 262 operates solenoid 50 by supplying power through its operated contact 346 and switch 245 starting the drum and cam rotation. Relay 262 operates relay 276 to open contact 347 and restore the filament current in tubes V4 and V5 and thereby start the bias oscillator and activate the automatic volume control circuits. Relay 276 connects the talk-out transducer 36 to the amplifier-bias oscillator output over a path which includes conductor 348, normal contact 350 of relay 268, switch 648, conductor 476, operated contact 352 of relay 276 and conductor 354. It connects the telephone set to the amplifier input over a path which includes conductors 400 and 408, switches 251, 252 and 246, conductors 360 and 362, transformer T2, conductor 364, operated contact 366 of relay 276 and conductor 368.

After one drum revolution, about 3 seconds, the mechanical trip mechanism comprising the pin 100 and the latch 102 drops erase coil 90 and erase current is cut off by switch 103. Approximately one-half second later, the talk-out message may be recorded on drum 18. During the recording of the message the limit switch 74 is moved physically by the transducer carriage 60.

Limit switch 74 will open at the end of its travel (after approximately 30 seconds) to release relay 266. On deenergizing, relay 266 releases solenoid 82 thereby allowing switch 74 to drop back to the minimum announcement position, and transducer 36 to return to its start position.

Relay 274 remains energized through switch 72 which is held closed until drum 18 is indexed and stops rotating.

When switch 72 opens, relays 644 and 274 are released.

Released relay 644 returns switches 648, 650, 652, 654, 656 and 658 to the positions shown in Fig. 5 thereby preparing the machine for the function of checking the recorded announcement.

Released relay 274 closes contact 675 thereby again completing the operate path relay 266 over conductor 674, closed contact 675 of relay 274 and conductor 516.

Relay 266, operated, locks up through stop switch 344, switch 248, switch 672, switch 156, limit switch 74 and conductors 456 and 458. Relay 266 operates relay 274, starting motor 8, applying power to the amplifier and extinguishing the ready lamp 336. Relay 266 also operates the talk-out drum clutch solenoid 50 over a path which includes conductor 376, switch 652, conductor 378, normal contact 380 of relay 262 and conductor 382.

The talk-out transducer 36 is connected to the amplifier input over the path which includes conductor 348, normal contact 350 of relay 268, switch 650, conductor 384, normal contact 386 of relay 276 and conductor 368. The amplifier output is connected to the telephone set over the path which includes transformer T1, conductor 388, normal contact 390 of relay 276, conductor 392, transformer T2, conductors 360 and 362, switches 246, 251 and 252, conductors 400 and 408 and operated contacts of relay 328. Cams 192, 194 and 196 rotate but perform no operating functions.

At the end of the talk-out message the limit switch 74 operates, releasing relay 266 and solenoid 50. The transducer carriage 60 and the cams 192, 194 and 196 return to stand-by positions.

When switch 72 opens, relay 274 will be released to close contact 675 thereby again completing the operate path for relay 266.

The announcement check function will be repeated until the telephone line is released by the subscriber.

When the subscriber releases the telephone line, relay 278 is deenergized and relays 642 and 646 will release and restore the machine to stand-by.

It is to be understood that the above-described arrangements are illustrative of the application of the principles of the invention. Other arrangements may be devised by those skilled in the art without departing from the spirit and scope of the invention. For example, the position of switch 640 may be determined by automatic means. By employing conventional timing means the position of switch 640 may be changed automatically at predetermined time intervals to provide either of the options described above.

What is claimed is:

1. A telephone system comprising a station provided with an automatic telephone answering and message recording device, said device including means for recording, reproducing and obliterating a message from a calling party, a telephone line connected to said device, means responsive to a signal transmitted over a first conductor of said line for conditioning said recording means to record a message, first means responsive to a signal transmitted over a second conductor of said line for conditioning said reproducing means to reproduce said message, second means responsive to said signal transmitted over said second conductor within a predetermined time interval after the reproduction of said recorded message has been terminated for conditioning said obliterating means to obliterate said message.

2. A telephone system comprising a station provided with an automatic telephone answering and message recording device, said device including means for recording an outgoing message for delivery to a calling party and means for recording and reproducing an incoming message received from said calling party, a telephone line connected to said device, means responsive to a signal transmitted over a first conductor of said line for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said outgoing message recording means to record a message.

3. A telephone system comprising a station provided with an automatic telephone answering and message recording device, said device including means for recording an outgoing message for delivery to a calling party and means for recording, reproducing and obliterating an incoming message received from said calling party, a telephone line connected to said device, means responsive to a signal transmitted over a first conductor of said line for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said incoming message obliterating means to obliterate said message, third means responsive to said signal transmitted over said second conductor within said predetermined time interval after the reproduction of said incoming message has been terminated for conditioning said outgoing message recording means to record a message, switch means for enabling one or the other of said second and third means to respond to said signal transmitted over said second conductor.

4. A telephone system comprising a station provided with an automatic telephone answering and message recording device, said device including means for recording, reproducing and obliterating a message from a calling party, a telephone line connected to said device, means responsive to a signal transmitted over a first conductor of said line for conditioning said recording means to record a message, first means responsive to a signal transmitted over a second conductor of said line for conditioning said reproducing means to reproduce said message, second means responsive to said signal transmitted over said second conductor within a predetermined time interval after the reproduction of said recorded message has been terminated for conditioning said obliterating means to obliterate said message, switch means for connecting said first and second responsive means to said second conductor, said switch means initially connecting said first means to said conductor, said switch means being actuated to open said initial connection after said first means responds to said signal, said switch means being actuated after the reproduction of said recorded message has been terminated to connect said second responsive means to said second conductor for said predetermined time interval during which the transmission of said signal over said conductor will condition said obliterating means, said switch means being actuated at the end of said time interval to restore said initial connection.

5. A telephone system comprising a station provided with an automatic telephone answering and message recording device, said device including means for recording an outgoing message for delivery to a calling party and means for recording and reproducing an incoming message received from said calling party, a telephone line connected to said device, means responsive to a signal transmitted over a first conductor of said line for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said outgoing message recording means to record a message, switch means for connecting said first and second responsive means to said second conductor, said switch means initially connecting said first means to said conductor, said switch means being actuated to open said initial connection after said first means responds to said signal, said switch means being actuated after the reproduction of said incoming message has been terminated to connect said second responsive means to said second conductor for said predetermined time interval during which the transmission of said signal over said conductor will condition said outgoing message recording means, said switch means being actuated at the end of said time interval to restore said initial connection.

6. A telephone system comprising a station provided with an automatic telephone answering and message recording device, said device including means for recording an outgoing message for delivery to a calling party and means for recording, reproducing and obliterating an incoming message received from said calling party, a telephone line connected to said device, means responsive to a signal transmitted over a first conductor of said line for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said incoming message obliterating means to obliterate said message, third means responsive to said signal transmitted over said second conductor within said predetermined time interval after the reproduction of said incoming message has been terminated for conditioning said outgoing message recording means to record a message, first switch means for enabling one or the other of said second and third means to respond to said signal transmitted over said second conductor, second switch means for connecting said first, second and third responsive means to said second conductor, said switch means initially connecting said first means to said conductor, said switch means being actuated to open said initial connection after said first means responds to said signal, said switch means being actuated after the reproduction of said incoming message has been terminated to connect the enabled one of said second and third responsive means to said second conductor for said predetermined time interval, said switch means being actuated at the end of said time interval to restore said initial connection.

7. A telephone system in accordance with claim 6 wherein said first switch means is actuated automatically at predetermined time intervals to enable one and then the other of said second and third responsive means.

8. A telephone system comprising a station provided with an automatic telephone answering and message recording device, said device including means for recording reproducing and obliterating an outgoing message for delivery to a calling party and means for recording and reproducing an incoming message received from said calling party, means for conditioning said outgoing message recording means to record a message at said station, a telephone line connected to said device, means responsive to a signal transmitted over a first conductor of said line for conditioning said outgoing message reproducing means to reproduce the recorded outgoing message and for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said outgoing message obliterating means to obliterate said recorded outgoing message and for conditioning said outgoing message recording means to record a message.

9. A telephone system comprising a station provided with an automatic telephone answering and message recording device, said device including means for recording, reproducing and obliterating an outgoing message for delivery to a calling party and means for recording, reproducing and obliterating an incoming message received from said calling party, means for conditioning said outgoing message recording means to record a message at said station, a telephone line connected to said device, means responsive to a signal transmitted over a first conductor of said line for conditioning said outgoing message reproducing means to reproduce the recorded outgoing message and for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said incoming message obliterating means to obliterate said message, third means responsive to said signal transmitted over said second conductor within said predetermined time interval after the reproduction of said incoming message has been terminated for conditioning said outgoing message obliterating means to obliterate said recorded outgoing message and for conditioning said outgoing message recording means to record a message, switch means for enabling one or the other of said second and third means to respond to said signal transmitted over said second conductor.

10. A telephone system comprising a station provided with an automatic telephone answering and message recording device, said device including means for recording, reproducing and obliterating an outgoing message for delivery to a calling party and means for recording, reproducing and obliterating an incoming message received from said calling party, means for conditioning said outgoing message recording means to record a message at said station, a telephone line connected to said device, means responsive to a signal transmitted over a first conductor of said line for conditioning said outgoing message reproducing means to reproduce the recorded outgoing message and for conditioning said incoming message recording means to record a message, first means responsive to a signal transmitted over a second conductor of said line for conditioning said incoming message reproducing means to reproduce said message, second means responsive to said signal transmitted over said second conductor within a predetermined time interval after the reproduction of said incoming message has been terminated for conditioning said incoming message obliterating means to obliterate said message, third means responsive to said signal transmitted over said second conductor within said predetermined time interval after the reproduction of said incoming message has been terminated for conditioning said outgoing message obliterating means to obliterate said recorded outgoing message and for conditioning said outgoing message recording means to record a message, first switch means for enabling one or the other of said second and third means to respond to said signal transmitted over said second conductor, second switch means for connecting said first, second and third responsive means to said second conductor, said switch means initially connecting said first means to said conductor, said switch means being actuated to open said initial connection after said first means responds to said signal, said switch means being actuated after the reproduction of said incoming message has been terminated to connect the enabled one of said second and third responsive means to said second conductor for said predetermined time interval, said switch means being actuated at the end of said time interval to restore said initial connection.

11. A telephone system in accordance with claim 10 wherein said first switch means is actuated automatically at predetermined time intervals to enable one and then the other of said second and third responsive means.

References Cited in the file of this patent

UNITED STATES PATENTS

| | | |
|---|---|---|
| 2,769,033 | Waldman | Oct. 30, 1956 |
| 2,778,876 | Gordon | Jan. 22, 1957 |
| 2,784,254 | Lane | Mar. 5, 1957 |

FOREIGN PATENTS

| | | |
|---|---|---|
| 733,436 | Great Britain | July 13, 1955 |